(12) United States Patent
Dillenberger et al.

(10) Patent No.: US 10,255,108 B2
(45) Date of Patent: Apr. 9, 2019

(54) PARALLEL EXECUTION OF BLOCKCHAIN TRANSACTIONS

(71) Applicant: International Business Machines Corporation, Armonk, NY (US)

(72) Inventors: Donna Eng Dillenberger, Yorktown Heights, NY (US); Gong Su, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 15/006,171

(22) Filed: Jan. 26, 2016

(65) Prior Publication Data

US 2017/0212781 A1    Jul. 27, 2017

(51) Int. Cl.
  *G06F 17/30* (2006.01)
  *G06F 9/50* (2006.01)

(52) U.S. Cl.
  CPC ...... *G06F 9/5038* (2013.01); *G06F 17/30587* (2013.01); *G06F 17/30958* (2013.01)

(58) Field of Classification Search
  CPC ............... G06F 9/466; G06F 17/30949; G06F 17/30958
  See application file for complete search history.

(56) References Cited

U.S. PATENT DOCUMENTS

| | | | |
|---|---|---|---|
| 9,298,806 B1 * | 3/2016 | Vessenes | G06Q 30/00 |
| 2016/0253622 A1 * | 9/2016 | Sriram | H04L 63/126 |
| | | | 713/179 |

* cited by examiner

*Primary Examiner* — Loc Tran
(74) *Attorney, Agent, or Firm* — Fleit Gibbons Gutman Bongini Bianco PL; Jon A. Gibbons

(57) ABSTRACT

A system, method, and computer readable storage medium for accessing a data file shared by all computing nodes participating in a system based on a blockchain protocol. The data file includes transactions and blocks. The transactions are data to be stored in the blockchain and the blocks are records that confirm when and in what sequence certain transaction became journaled as part of the blockchain. A request is received to include a plurality of transactions each with additional data as a new block on the blockchain. Criteria that includes a settable period of time or a settable number of transactions received is used to determine how many transactions go into a new block. A directed acyclic graph (DAG) is accessed that is constructed based on inter-dependencies among the transactions. The transactions for the new block are divided into a set of two or more independent tasks that can be executed in parallel based on the DAG. The independent tasks that can be managed independently are executed.

20 Claims, 5 Drawing Sheets

PARALLEL EXECUTION OF BLOCKCHAIN TRANSACTIONS

BACKGROUND

The present invention generally relates to permissionless distributed databases, and more particularly to blockchains.

Blockchains are ledgers that multiple servers host the same copy. Currently blockchains are processed serially. Blockchains can grow infinitely long. In current blockchain systems, execution of transactions in a block is done sequentially, i.e., one after another. This results in suboptimal performance.

SUMMARY

The present invention used Directed Acyclic Graphs (DAG) to enable parallel processing of a blockchain and keep track of dependencies of transactions across parallel execution.

To build the transaction dependency DAG, in one example, the dependency between a transaction input and another transaction output is identified. With a suitable programming language describing a transaction, this dependency can be derived from the function signature of a transaction. Once the DAG has been constructed, parallel and sequential execution of transactions are scheduled.

More specifically, disclosed is a system, a method, and a computer readable storage medium for accessing a data file shared by all computing nodes participating in a system. The system is based on a blockchain protocol. The data file includes transactions and blocks. The transactions are data to be stored in the blockchain. The blocks are records that confirm when and in what sequence certain transaction became journaled as part of the blockchain. A request is create a new block on the blockchain. The request includes a plurality of transactions each with additional data. Settable criteria that includes at least one of a settable period of time or a settable number of transactions received is used to determine how many transactions go into a new block. A directed acyclic graph (DAG) is accessed that is constructed based on inter-dependencies among the plurality of transactions. The transactions for the new block are divided into a set of two or more independent tasks that can be executed in parallel based on the DAG. The independent tasks are executed. The results from each of the independent tasks are combined into the new block on the blockchain.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
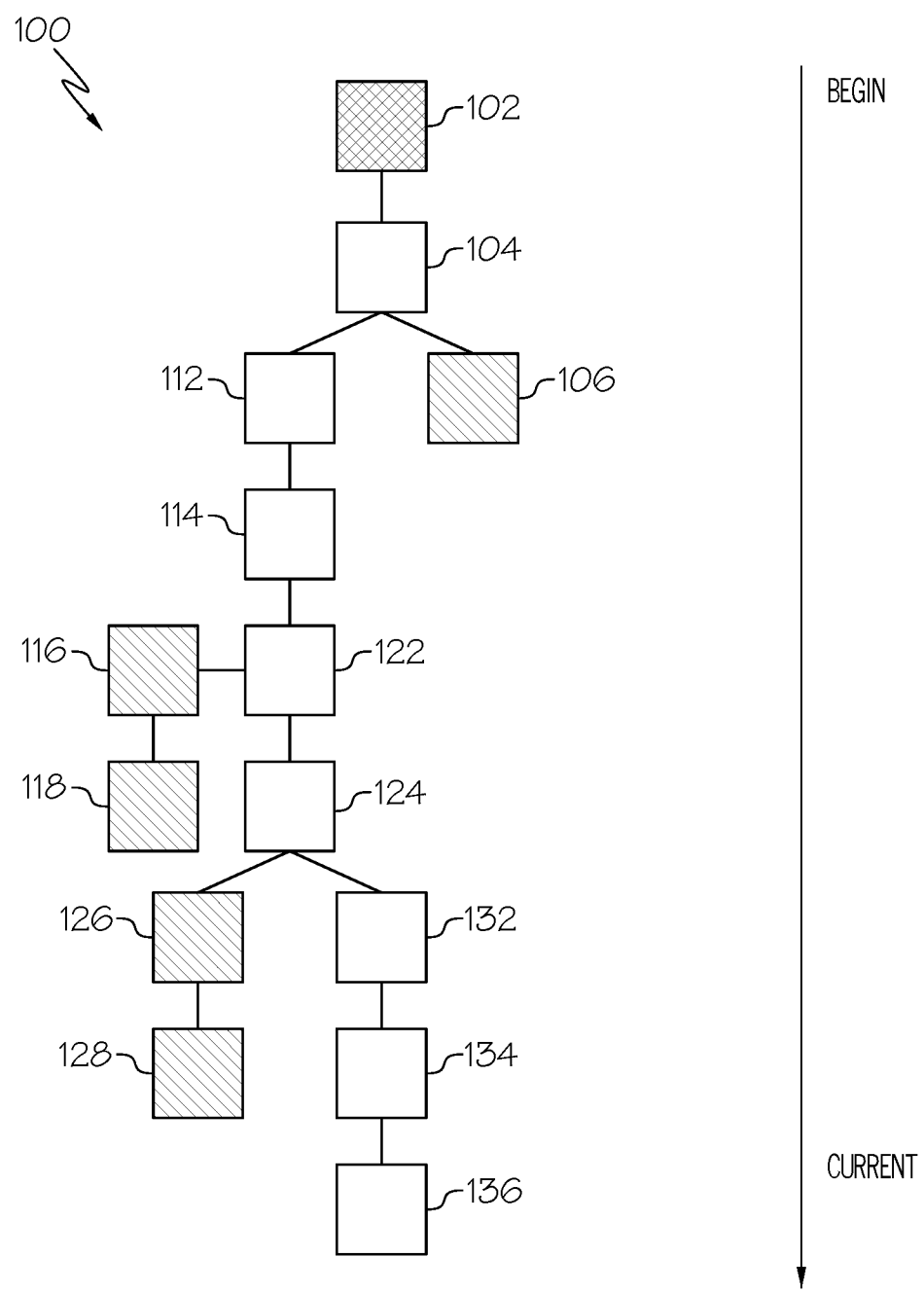
FIG. 1 is a diagram 100 illustrating a simple blockchain.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

To build the transaction dependency DAG, in one example, the dependency between a transactions input and another transaction output is identified. With a suitable programming language describing a transaction, this dependency can be derived from the function signature of a transaction. Any programming language can be used to write a transaction in theory. But some systems, such as Ethereum, opt to have its own language, known as Solidity, in order to be able to control what a transaction can do. The only requirement for constructing the DAG is that whatever language used to write the transaction clearly specify the inputs and outputs of the transaction. Once the DAG has been constructed, parallel and sequential execution of transactions are scheduled.

Non-Limiting Definitions

The terms "a", "an" and "the" are intended to include the plural forms as well, unless the context clearly indicates otherwise.

The term "blockchain" or "blockchain" is a distributed database that keeps a continuously growing list of data records. Each data record is protected against tampering and revisions. Blockchains are used with public ledgers of transactions, where the record is enforced cryptographically.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "computing node" is used to mean computational device with an internal address that can host a copy of a blockchain and the associated transactions.

The term "directed acyclic graph" also referred to as a "DAG" is a directed graph with no directed cycles. That is, it is formed by a collection of vertices and directed edges, each edge connecting one vertex to another, such that there is no way to start at some vertex v and follow a sequence of edges that eventually loops back to v again. Note that the DAG as used herein, which is a dependency graph for scheduling parallel execution of transactions, should not be confused with the Ethash DAG in Ethereum, which is a DAG of hash values constructed for computing proof-of-work (POW) that is both CPU and memory intensive in order to defeat the use of special ASICs for computing POW.

The term "hash function" is a mathematical algorithm turns an arbitrarily-large amount of data into a fixed-length size. The same hash will always result from the same data, but modifying the data by even one bit will completely change the hash. The values returned by the hash function are called a "hash".

The term "public ledger" is a public accessible listing of transactions for the distributed database or blockchain.

Overview of Blockchain

FIG. 1 is a diagram 100 illustrating a simple blockchain. Blocks in the main chain 102, 104, 112, 114, 122, 124, 132, 134, 136 are the longest series of blocks that go from the beginning block 102 to the current block 136. For any block in the blockchain, there is only one path from the beginning block 102 to the current block 136. Blocks 106, 116, 118, 126, 128 are blocks that are not in the longest chain. Because this is distributed system, blocks 116, 118, 126, 128 are typically created only a few seconds apart from the main chain. Whenever a fork happens, generating computing nodes build onto which ever block is received first in time. Therefore the short chain of blocks 116, 118, 126, 128 not used.

In another example, each users of the blockchain in FIG. 1 is a member. Only after a set number of members vote on the addition of a new block in the block chain, is a block chain added. In this member-based system, the short chains of block 116, 118, 126, 128 are not created.

The blockchain 100 implementation consists of two kinds of records: transactions and blocks. Transactions are the actual data stored in the blockchain. As shown the data in each of the blockchain is encrypted as shown graphically by the lock. In one example, the data in each block represents a single transaction. In another example, data in each block represents more than on transaction that is dividable into sections within each block, such as, a music track from a complete CD recording or an image in series of images. Transactions are created by users or participants using the system.

The blocks are recorded that confirm when and in what sequence certain transaction become journaled as back of the blockchain database.

Figure 2:
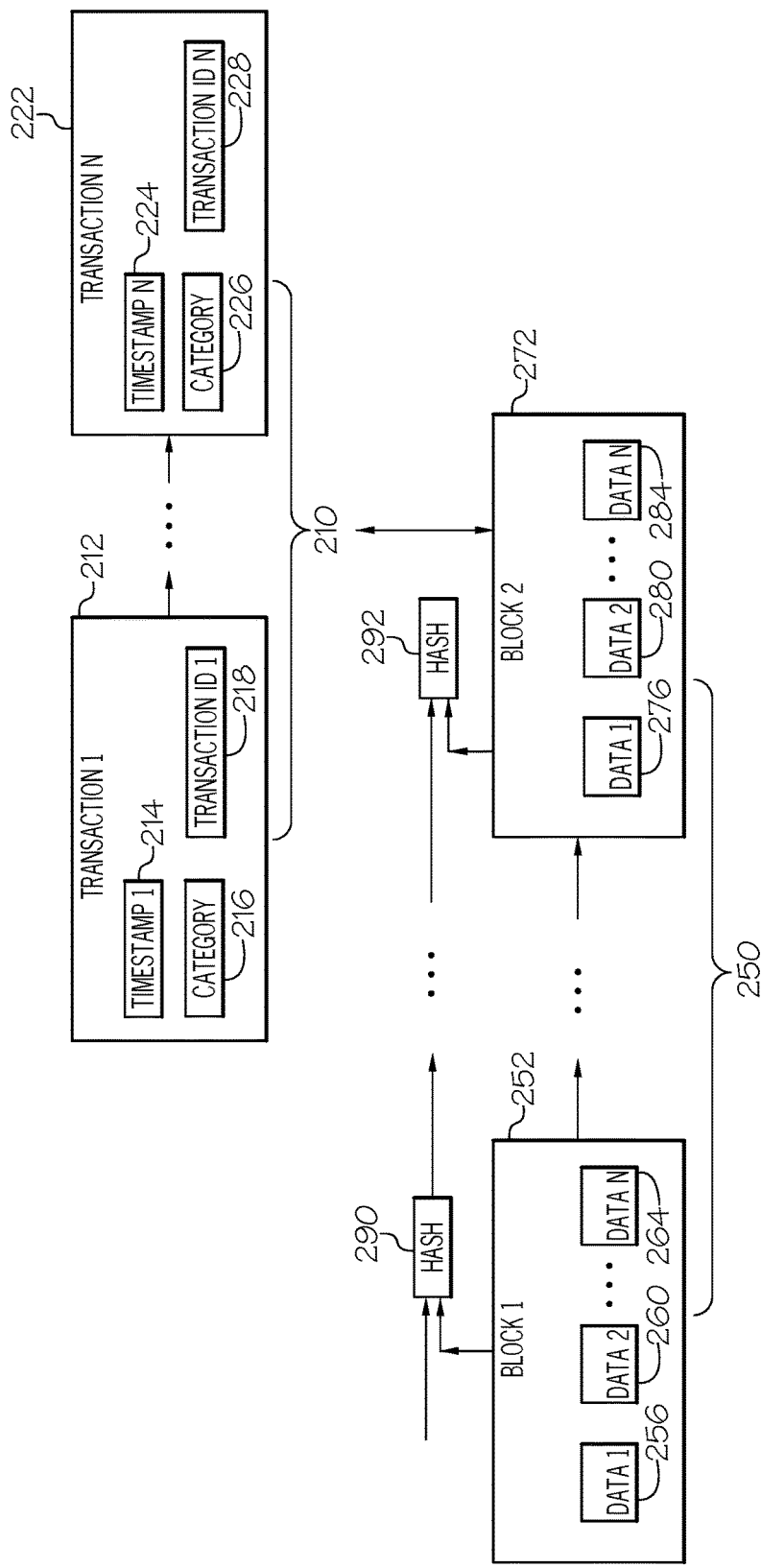
FIG. 2 is a functional diagram illustrating details of each block and transaction in the blockchain of FIG. 1.

FIG. 2 is a functional diagram 200 illustrating details of each block and transaction in the blockchain of FIG. 1. Shown are two kinds of record blocks 210 and transactions 250. The transactions 250 are actual data stored in the blockchain 200. The blocks 210 are records of transactions. In this example transactions 210 are all associated with block 2 272. Other transactions (not shown are associated with block 1 252).

Record blocks 210 represent a series of transactions 212 through 212 as shown for transactions 1 through transaction n respectively. Each block 210 representing a transaction typically includes a timestamp 214, 224 of the transaction. A unique transaction identifier 218, 228 is also shown. This transaction id can be search for a specific item in the transactional database management system. Also shown is an optional category for the transaction 216, such as photo, medical, financial, employment, etc. to associate with the additional data in the transactions 250 described below.

A hash function 290 and 292 is shown as part of the record blocks 210. In one implementation of a blockchain, the previously hash function 290 is input to a subsequent hash function 292, along with the transaction 1 as shown. This ensures that there has been no tampering or alteration of the data in the record blockchain.

Transactions 250 shown in block 1 through block n, (252, 272) contain user or additional data 256, 260, 264, 276, 280, 284. The additional data can represent any multimedia data including text, audio, video, images, financial statements, and more.

Dividing Transactions Based on DAG

Figure 3:
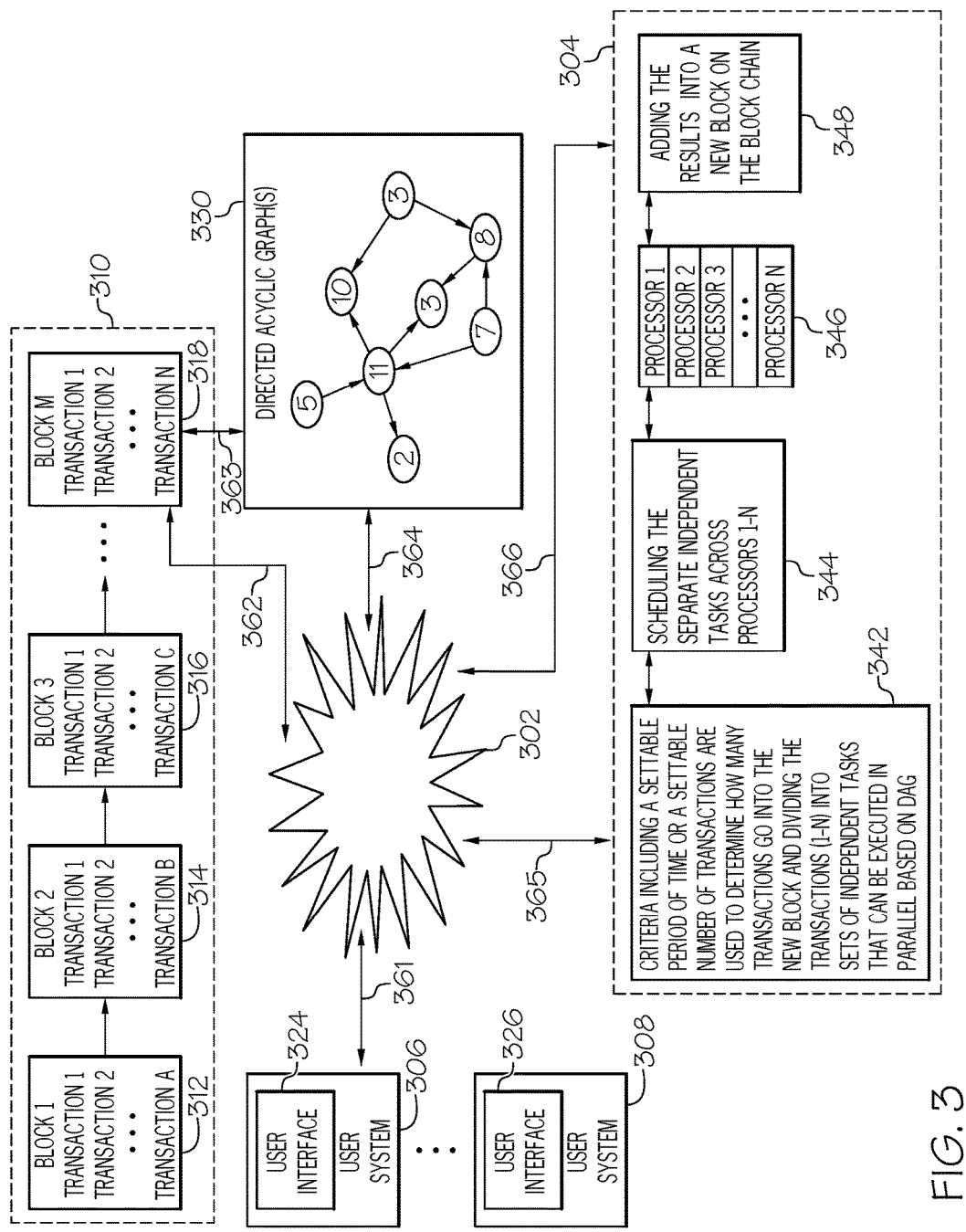
FIG. 3 a block diagram illustrating one example of an operating environment of the dividing up transactions using a DAG when creating a new block in the blockchain.

FIG. 3 a block diagram illustrating one example of an operating environment 300 of the dividing up transactions using a DAG when creating a new block in the blockchain. The transactions are then executed in parallel.

The operating environment of FIG. 3 can be a cloud computing environment or a non-cloud computing environment. In a cloud computing environment, various embodiments of the present invention discussed below are provided as a service. FIG. 3 illustrates one or more networks 302 that, in one example, can include wide area networks, local area networks, wireless networks, and/or the like. The environment 300 includes a plurality of information processing systems 304, 306 that are communicatively coupled to the network(s) 302. The information processing systems 304, 306 include one or more servers 304 and one or more user systems 306, 308. The user systems 306, 308, 310 can include, for example, information processing systems such as desktop computers, laptop computers, tablet-based computers, wireless devices such as mobile phones, personal digital assistants, and the like.

FIG. 3 further illustrates as part of the server system 304 with one or more databases 310 based on a blockchain protocol storing blocks 312, 314, 316, 318 and communicatively coupled to the network 302.

One or more users through the user interface 324, 326 on users systems 306, 308 send a new request 362, 364 with a plurality of transactions 1, 2 . . . N with additional data as a new block M 318 on a blockchain 310. A directed acyclic graph (DAG) 330 is constructed 366 based on inter-dependencies among the plurality transactions in the new block 318 of blockchain 310. The inter-dependencies include identifying the dependencies among inputs and outputs of one or more of the transactions. The DAG can be part of the databases 310 or server 304 or combined within both.

Next logic 342 in the server 304 includes settable criteria, such as, a period of time, a number of transactions received in the request, or a combination of both are used determine first how many transactions go into a new block. The logic 342 is used to divide the plurality of transactions for the new block 318 into a set of two or more independent tasks. These independent tasks are identified based on the DAG 330, 364. The independent tasks are identified to be capable of execution in parallel.

The independent tasks that are identified are scheduled 344 to run substantially in parallel across processors 1-N 346. This parallelism can be accomplished as separate tasks, threads or using separate processors or processing cores or separate parallel computer systems.

Figure 4:
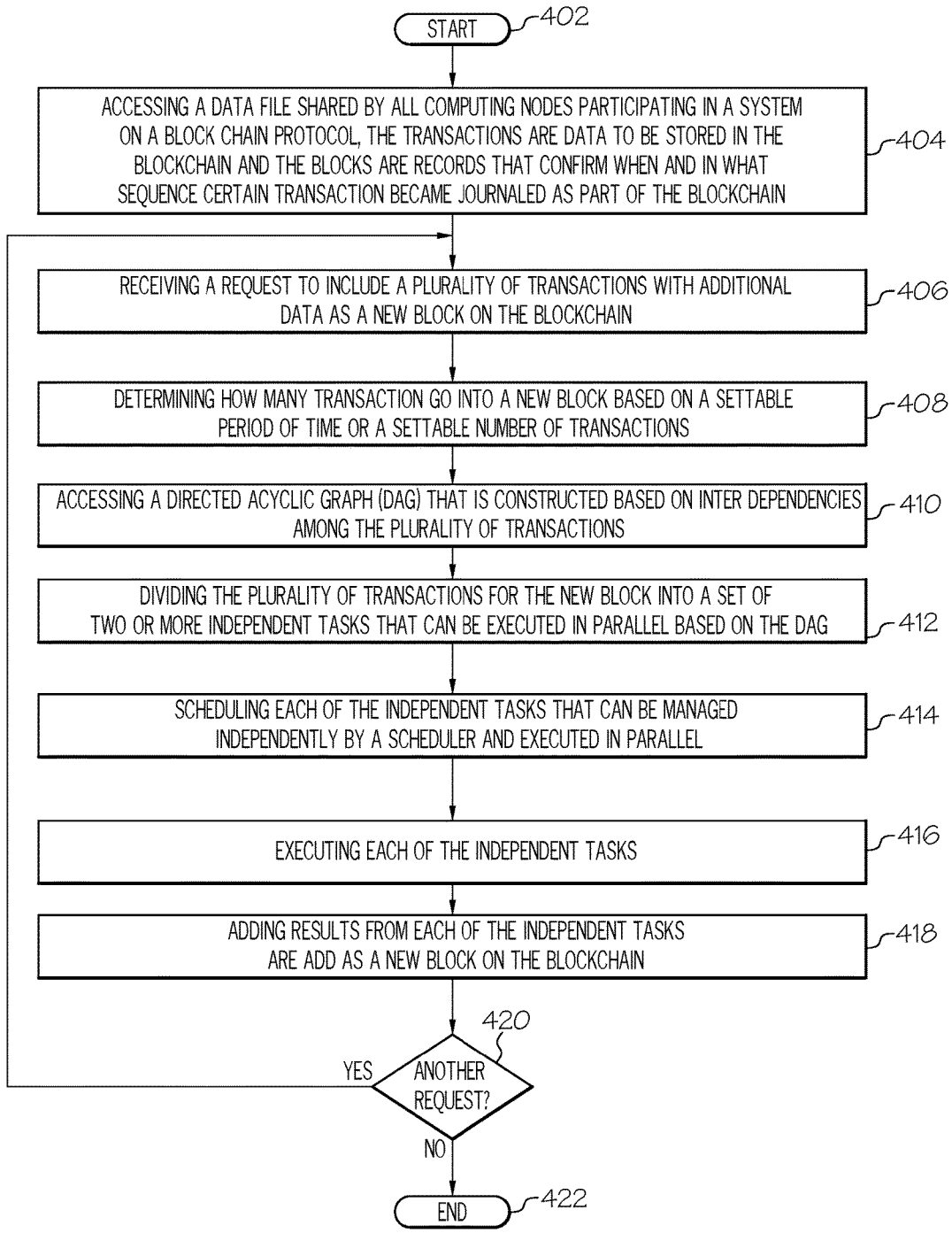
FIG. 4 is a flow diagram illustrating storing content in a blockchain.

The results 348 of the independent tasks are added 366, 362 into the new block 318. This parallelism results in much faster processing of block chain transactions. As shown in FIG. 2, a hash of the previous block 292, typically is included in the hash of the new block 318, therefore forming a chain of hashes. A timestamp and transaction identifier may also be included for the new block. The transaction identifier and/or timestamp is also used when reading information from the block Flow Diagram of Storing and Reading Content in a Blockchain FIG. 4 is a flow diagram 400 illustrating storing content in a blockchain. The process begins in step 402 and immediately proceeds to step 404. A computing node receives a request from a user or entity. The computing node is one of multiple computing nodes in a system using a blockchain protocol to share a data file including transactions and blocks. As described above, the blocks 250 are data to be stored in the blockchain 200 and the record blocks 210 are records that confirm when and in what sequence certain transaction became journaled as part of the blockchain 200.

Typically the request received is signed by a user system 306, 308 to include a new transaction with a plurality of transactions each with additional data to add as a new block 318 in the blockchain 310 in step 406.

In step 408, the number of transactions that can go into the new block 318 is determined based on a settable period of time, a settable number or transactions, or both. This can be set by a system administrator.

In step 410, a directed acyclic graph (DAG) 330 that is constructed based on inter-dependencies among the plurality of transactions in the new block 318 of blockchain 310. The plurality of transactions for the new block 318 is divided into a set of two or more independent tasks in step 412 based on the DAG. These independent tasks can be executed in parallel.

Each of these independent tasks that can be managed independently by a scheduler are scheduled and executed in parallel in steps 414, 416. The results from each of the independent tasks are added as a new block 318, on blockchain 310. A transaction identifier 218, 228, which is unique to each transaction in the blockchain is typically included. Optionally, a timestamp 214, 224, and/or category 216, 226 of the additional data is included. Also, a hash 292 of a previous block 272 is included in the hash of the new block 318 as well to make tampering or changes to the blockchain 200 difficult.

A test is made in step 420 to see if there is another request from the user system 306, 308, If there is subsequent request, the process returns to step 406. Otherwise the process flow ends in step 422.

In the event a read request received with a transaction identifier 218, 228 from a user system 306, 308, to access data journaled as part of a blockchain 250, 310. The transactional database management system is searched using the identifier for a corresponding transaction in the blockchain 250, 310.

In response to finding the corresponding transaction in the blockchain 250, 310, the data is made available to the user system 306, 308.

Generalized Computing Environment

Figure 5:
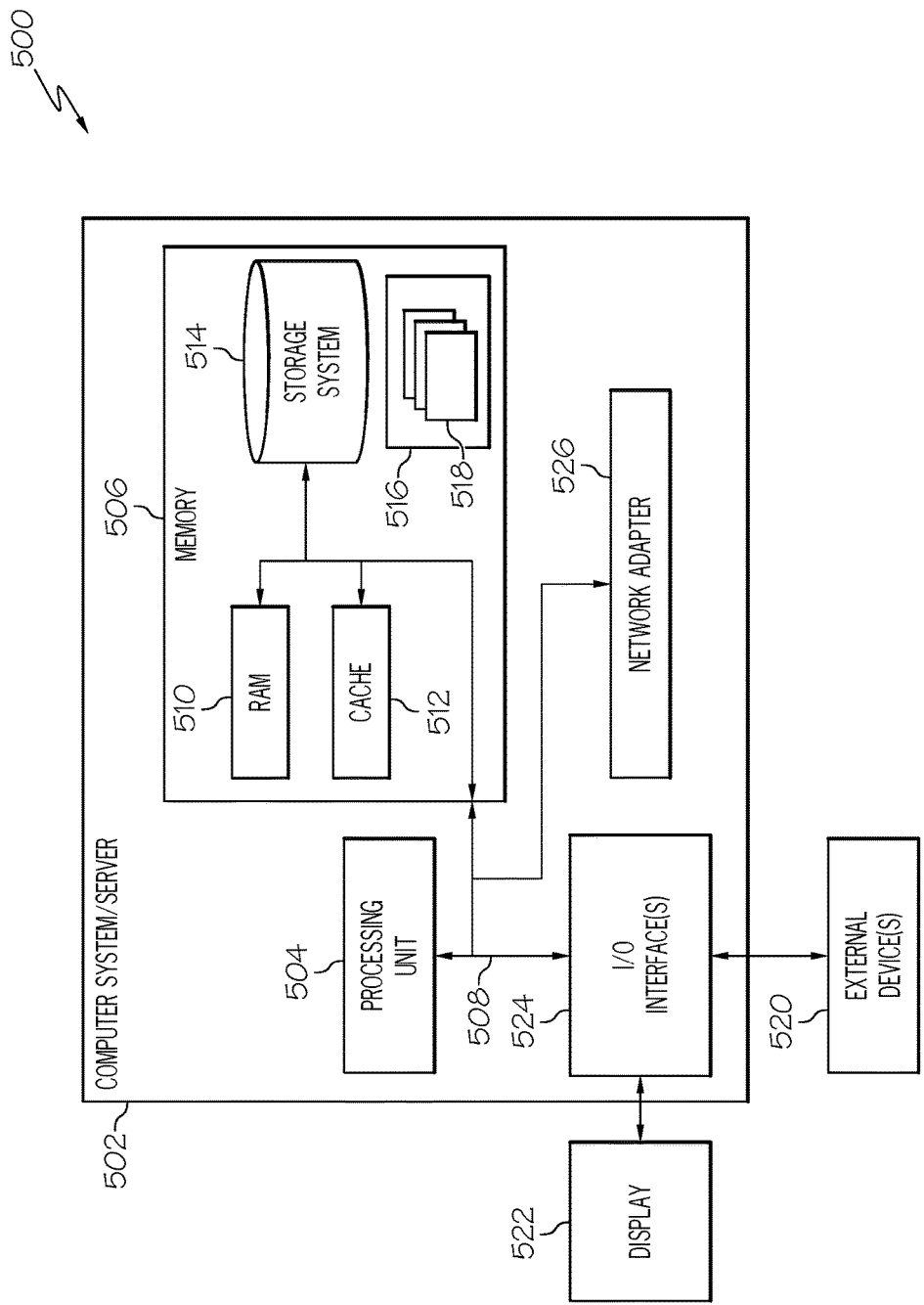
FIG. 5 illustrates one example of a computing or processing node for operating a node in a blockchain.

FIG. 5 illustrates one example of a computing or processing node 500 for operating a node in a blockchain. This is not intended to suggest any limitation as to the scope of use or functionality of embodiments of the invention described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506, in one embodiment, implements the flow diagram of FIG. 3 and the flow chart of FIG. 4. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of various embodiments of the invention.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 502 may also communicate with one or more external devices 1020 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

NON-LIMITING EXAMPLES

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A computer-based method comprising:
accessing, by a processor, a data file shared by all computing nodes participating in a system based on a blockchain protocol, the data file including transactions and blocks, where the transactions are data to be stored in the blockchain and the blocks are records that confirm when and in what sequence certain transaction became journaled as part of the blockchain;
receiving at least one request to include a plurality of transactions each with additional data as a new block on the blockchain;
using criteria that includes at least one of a settable period of time, a settable number of transactions received or a combination of both to determine a quantity of the plurality of transactions go into a new block;
accessing a directed acyclic graph (DAG) that is constructed based on inter-dependencies among inputs and outputs of the plurality of transactions;
dividing, up to the quantity which has been determined, the plurality of transactions for the new block into a set of two or more independent tasks that can be executed in parallel based on the DAG;
scheduling each of the independent tasks that can be managed independently by a scheduler;
executing each of the independent tasks; and
adding results from each of the independent tasks as the new block on the blockchain.
2. The computer-based method of claim 1, wherein the DAG based on inter-dependencies among the plurality of transactions includes identifying inputs and outputs of one or more of the transactions.
3. The computer-based method of claim 1, wherein the independent tasks are substantially executed in substantially in parallel.
4. The computer-based method of claim 3, wherein the independent tasks are substantially executed in parallel as separate threads.
5. The computer-based method of claim 3, wherein the independent task are substantially executed in parallel on separate processing cores.
6. The computer-based method of claim 1, wherein the adding results from each of the independent tasks as the new block on the blockchain includes adding the new block that records the transactions with a hash of a previous block.
7. The computer-based method of claim 6, wherein the adding results from each of the independent tasks as the new block on the blockchain includes adding the new block that records the new transaction with additional data in the blockchain includes a timestamp.
8. The computer-based method of claim 6, wherein the adding results from each of the independent tasks as the new block on the blockchain includes adding the block that records the new transaction with additional data in the blockchain includes a transaction identifier.

9. The computer-based method of claim 1, wherein the request includes searching the data file using an identifier for a corresponding transaction in the blockchain;
in response to finding the corresponding transaction in the blockchain, making available data stored in a corresponding block to at least one user system.

10. A system comprising:
a memory;
a processor communicatively coupled to the memory, where the processor is configured to perform
accessing, by a processor, a data file shared by all computing nodes participating in a system based on a blockchain protocol, the data file including transactions and blocks, where the transactions are data to be stored in the blockchain and the blocks are records that confirm when and in what sequence certain transaction became journaled as part of the blockchain;
receiving at least one request to include a plurality of transactions each with additional data as a new block on the blockchain;
using criteria that includes at least one of a settable period of time, a settable number of transactions received or a combination of both to determine a quantity of the plurality of transactions go into a new block;
accessing a directed acyclic graph (DAG) that is constructed based on inter-dependencies among inputs and outputs of the plurality of transactions;
dividing, up to the quantity which has been determined, the plurality of transactions for the new block into a set of two or more independent tasks that can be executed in parallel based on the DAG;
scheduling each of the independent tasks that can be managed independently by a scheduler;
executing each of the independent tasks; and
adding results from each of the independent tasks as the new block on the blockchain.

11. The system of claim 10, wherein the DAG based on inter-dependencies among the plurality of transactions includes identifying inputs and outputs of one or more of the transactions.

12. The system of claim 10, wherein the independent tasks are substantially executed in substantially in parallel.

13. The system of claim 12, wherein the independent tasks are substantially executed in parallel as separate threads.

14. The system of claim 12, wherein the independent task are substantially executed in parallel on separate processing cores.

15. The system of claim 10, wherein the adding results from each of the independent tasks as the new block on the blockchain includes adding the new block that records the transactions with a hash of a previous block.

16. The system of claim 15, wherein the adding results from each of the independent tasks as the new block on the blockchain includes adding the new block that records the new transaction with additional data in the blockchain includes a timestamp.

17. The system of claim 15, wherein the adding results from each of the independent tasks as the new block on the blockchain includes adding the block that records the new transaction with additional data in the blockchain includes a transaction identifier.

18. A computer program product comprising: a non-transitory storage medium readable by a processing circuit and storing instructions for execution by the processing circuit for performing accessing, by a processor, a data file shared by all computing nodes participating in a system based on a blockchain protocol, the data file including transactions and blocks, where the transactions are data to be stored in the blockchain and the blocks are records that confirm when and in what sequence certain transaction became journaled as part of the blockchain; receiving at least one request to include a plurality of transactions each with additional data as a new block on the blockchain; using criteria that includes at least one of a settable period of time, a settable number of transactions received or a combination of both to determine a quantity of the plurality of transactions go into a new block; accessing a directed acyclic graph (DAG) that is constructed based on inter-dependencies among inputs and outputs of the plurality of transactions; dividing, up to the quantity which has been determined, the plurality of transactions for the new block into a set of two or more independent tasks that can be executed in parallel based on the DAG; scheduling each of the independent tasks that can be managed independently by a scheduler; executing each of the independent tasks; and adding results from each of the independent tasks as the new block on the blockchain.

19. The non-transitory computer program product of claim 18, wherein the DAG based on inter-dependencies among the plurality of transactions includes identifying inputs and outputs of one or more of the transactions.

20. The non-transitory computer program product of claim 18, wherein the independent tasks are substantially executed in substantially in parallel.

* * * * *